United States Patent

[11] 3,626,309

| [72] | Inventor | Terence John Knowles<br>Oak Park, Ill. |
| --- | --- | --- |
| [21] | Appl. No. | 2,015 |
| [22] | Filed | Jan. 12, 1970 |
| [45] | Patented | Dec. 7, 1971 |
| [73] | Assignee | Zenith Radio Corporation<br>Chicago, Ill. |

[54] SIGNAL TRANSMISSION SYSTEM EMPLOYING ELECTROACOUSTIC FILTER
4 Claims, 7 Drawing Figs.

[52] U.S. Cl....................................................... 329/117,
307/213, 329/198, 330/38 M, 330/174, 333/30,
333/72
[51] Int. Cl....................................................... H03d 3/16
[50] Field of Search............................................ 333/72, 30;
329/198, 117, 119; 330/38 M, 174; 307/213

[56] References Cited
UNITED STATES PATENTS

| 3,479,572 | 11/1969 | Pokorny........................ | 333/30 X |
| 3,401,360 | 9/1968 | Schulz-Du Bois............. | 333/30 |
| 3,376,572 | 4/1968 | Mayo............................ | 333/72 X |
| 3,487,318 | 12/1969 | Herman........................ | 329/117 |

Primary Examiner—Alfred L. Brody
Attorneys—Francis W. Crotty, Hugh H. Drake and John J. Pederson

ABSTRACT: An acoustic-surface-wave system is used in coupling a signal source to a load. This system comprises an acoustic wave propagating medium with a single transducer at one end and at least a pair of transducers at the other. One end constitutes the input which connects to a signal source and the other connects to a load. A matrix including a pair of variable gain amplifiers couples the pair of transducers to its assigned terminal apparatus and controls the relative amplitudes of the signals transmitted by this transducer pair in determining the amplitude-frequency response of the system. Further control of the response characteristic is available by using unequal spacing along the medium of the members of the transducer pair relative to the aforesaid single transducer.

The acoustic-surface-wave system is also used in a unique frequency-modulation detector and also in neutralizing feedback in transistor amplifiers.

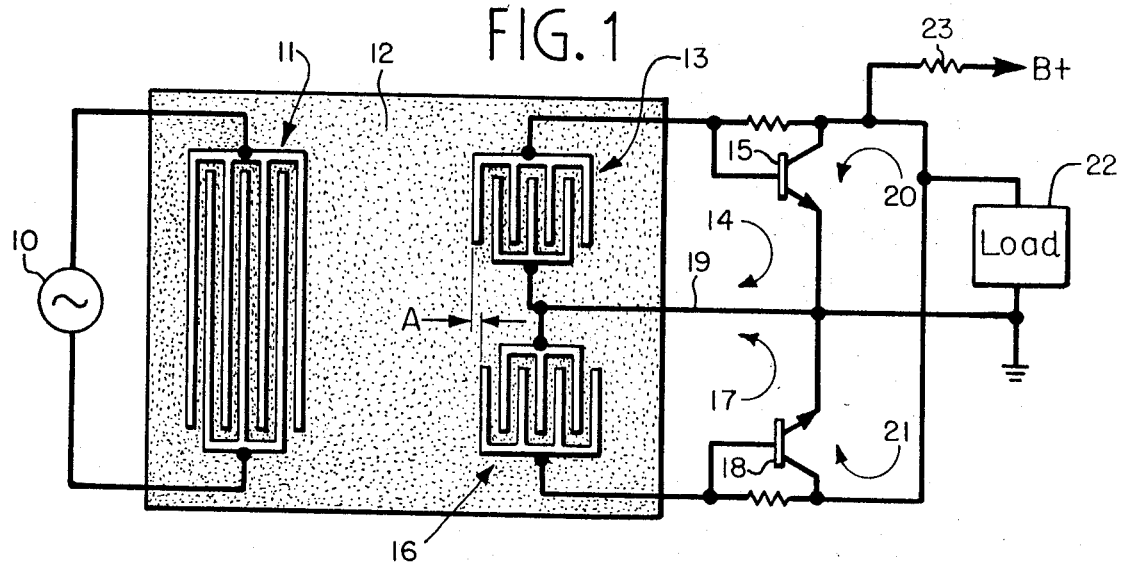
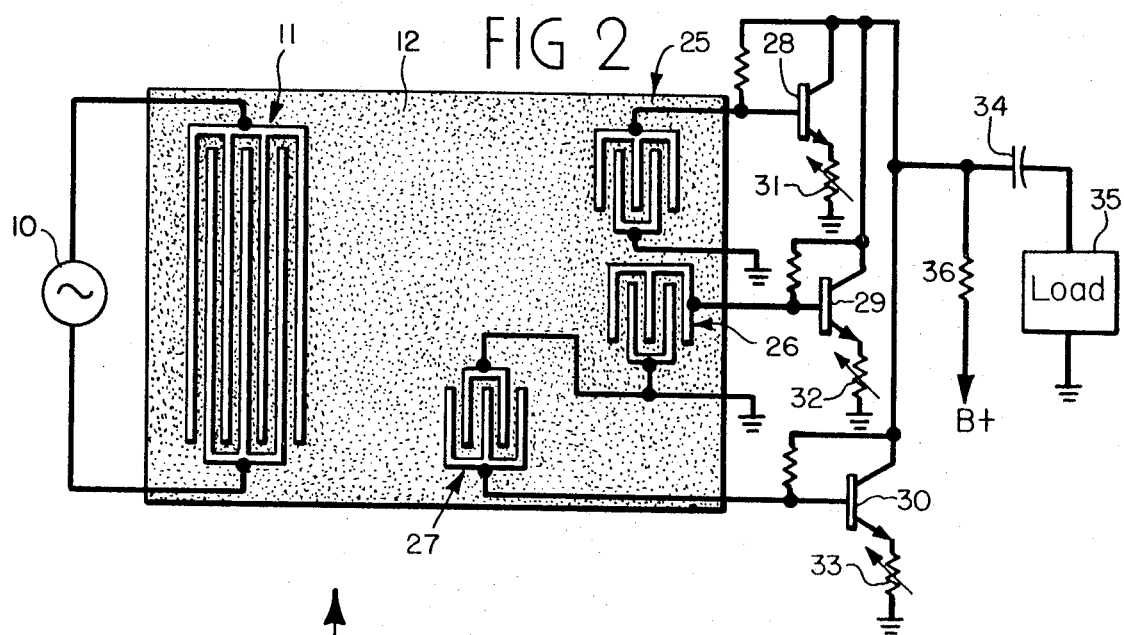
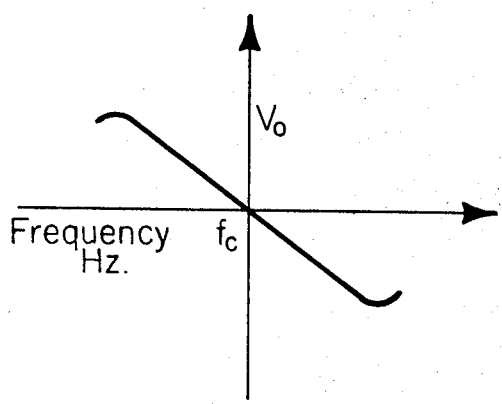
Inventor
Terence J. Knowles
By Francis W. Crotty
Attorney Inventor
Terence J. Knowles
By Francis W. Crotty
Attorney

SIGNAL TRANSMISSION SYSTEM EMPLOYING ELECTROACOUSTIC FILTER

This invention pertains to SWIFS, which is an abbreviation for surface-wave integratable filters. More particularly, it relates to acoustic-surface-wave devices that are of unique construction in that their signal amplitude and frequency characteristics are subject to adjustment and control.

Much attention has been focused recently on the use of acoustic surface waves in the transmission of signal energy between pairs of input and output terminals. As disclosed in detail in copending application, Ser. No. 721,038, filed Apr. 12, 1968, signal energy is converted to and from acoustic surface waves by means of transducers associated with the input and output terminals and the construction of the transducers themselves constitutes a convenient and flexible tool for tailoring the frequency-response or selectivity characteristic of the signal transmission channel in which the devices are utilized. Additionally, the distance of surface-wave travel in the devices corresponds to a certain time delay of the transmitted signals, and control of that distance serves as a means of incorporating a desired delay in a given system. Because they do exhibit frequency-selective and phase-shift characteristics, SWIFS are admirably suited for use in replacing such conventional discrete components as wound-coil inductors. Through the use of such devices to eliminate discrete inductive components of signal translating systems, it becomes possible to fully integrate in solid-state form complete systems such as those found in color television receivers.

Notwithstanding the aforementioned advantages available with SWIF systems, the integration of many signal-translating stages into a single-integrated package may result in extremely small tolerances during fabrication. Where this is so, a slight imperfection in the manufacture of one stage may significantly and adversely influence the performance of a subsequent stage. Thus, fixed selectivity characteristics, purposefully imposed on the SWIF by virtue of its design to provide stability, may result in less than optimum performance of the overall system through some small error of fabrication.

In certain applications in which SWIFS are beneficial, an ability to vary the overall selectivity characteristic of the signal transmission channel may be desirable. While, once manufactured, the SWIF itself is characterized by very stable parameters and has the other advantages outlined above such as that of facilitating complete integration, the use of a SWIF may impose a lack of flexibility of adjustment in the system in which it is utilized.

It is a general object of the present invention, therefore, to provide SWIF systems that take advantage of one or more of the previously propagating attributes of a SWIF while, at the same time, overcoming inflexibility which has heretofore been a possible disadvantage.

Another object of the invention is to provide new and improved SWIF systems in which performance versatility is obtained without sacrificing essential stability.

Further objects of the present invention are to provide new and improved SWIF systems that serve to reject spurious signals, are subject to adjustment of selectivity, permit manual or automatic gain control, serve to discriminate frequency-modulated signals with a high degree of fidelity, or enable neutralization of unwanted parasitic effects caused by associated elements.

In accordance with the invention a signal transmission system interposed between a signal source and a load comprises an acoustic-wave-propagating medium. A first interaction means is coupled to the signal source and to the medium for launching acoustic waves in the medium in response to signals from the source. A second interaction means is coupled to the medium and to the load for responding to the surface waves to deliver output signals to the load. One of the interaction means includes a single acoustic-surface-wave transducer and the other interaction means includes a plurality of such acoustic-surface-wave transducers individually spaced along the medium a predetermined distance from the single transducer and all of the transducers have a maximum response at substantially the same frequency. A matrix means couples the plurality of transducers of the aforesaid other interaction means to its assigned one of the source or load. The matrix means includes a corresponding plurality of variable gain electron valves for controlling the relative amplitudes of the signals transmitted through the plurality of transducers to determine the amplitude-frequency response of the system.

The features of the present invention which are believed to be novel are set forth with particularity in the appended claims. The organization and manner of operation of the invention, together with further objects and advantages thereof, may best be understood by reference to the following description taken in conjunction with the accompanying drawings in the several figures of which like reference numerals identify like elements and in which:

FIGS. 1, 2, 3, 4 and 6 are schematic diagrams of individually different embodiments of SWIF system;

FIGS. 2a and 5 are diagrams illustrating the operation of certain of those embodiments.

Figure 3:
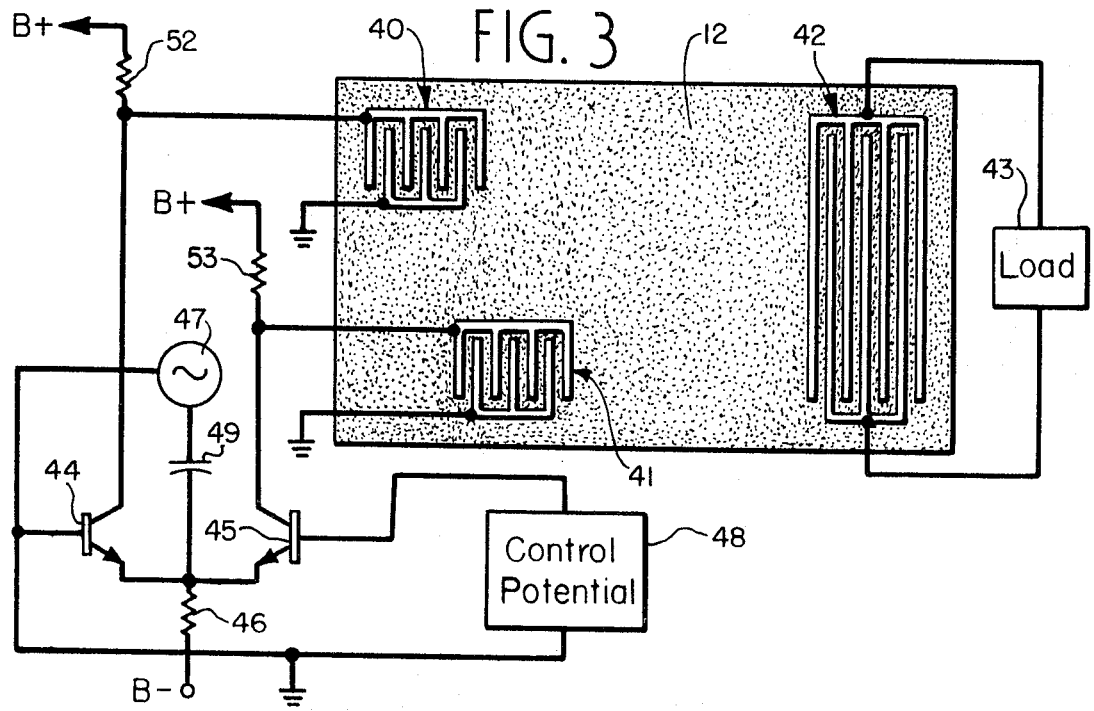

In FIG. 1, a signal source 10 is connected across an input interaction means or transducer 11 which is mechanically coupled to one major surface of an acoustic-wave-propagating medium in the form of a body or substrate 12 of piezoelectric material. Mechanically coupled to another portion of the same surface of substrate 12 is a first output transducer 13 across which is coupled the input circuit 14 of an electron valve in the form of an NPN-transistor 15. Also mechanically coupled to another portion of the same surface of substrate 12 is a second and like output transducer 16 across which is coupled the input circuit 17 of yet another NPN-transistor 18. Input circuits 14 and 17 individually include the respective base and emitter electrodes of their corresponding transducers, and the two input circuits have a common leg 19. The output circuits 20 and 21, between the respective collectors and emitters, are connected in parallel through a common load 22. Transistors 15 and 18 are energized for amplifier operation by a source of unidirectional potential, indicated by the symbol B+, connecting them in parallel by way of a load resistor 23. The other side of the supply potential source is connected to the emitters by way of a plane of reference potential shown as ground. Transducers 13 and 16 of the output acoustic interaction means are spaced unequal distances from input transducer 11 for reasons to be made clear presently.

Transducers 11, 13 and 16 are each constructed as pairs of comb-type electrode arrays. The strips or conductive elements of one comb in any such transducer are interleaved with the strips of the other. The electrodes are deposits of a material, such as gold or aluminum, which may be vacuum deposited on a highly lapped and polished planar surface of the piezoelectric body. The piezoelectric material is one, such as PZT or quartz, that is propagative of surface acoustic waves. The distance between the centers of two consecutive strips of each array is one-half of the acoustic wavelength of the signal for which it is desired to achieve maximum response, and as illustrated each of transducers 11, 13 and 16 exhibit maximum response at the same frequency.

Direct piezoelectric surface-wave transduction is accomplished by the spatially periodic interdigital electrodes of transducer 11. Considering this device as a transmitter, a periodic electric field is produced when a signal from source 10 is fed to the electrodes and, through piezoelectric coupling, the electric signal is transduced to an acoustic wave traveling on the surface of substrate 12. This occurs when the strain components produced by the electric field in the piezoelectric substrate are substantially matched to the strain components associated with the surface-wave mode. Source 10, for example a portion of a television receiver, may produce a range of signal frequencies, but due to the frequency selective nature of the SWIF arrangement only a chosen range of frequencies including a carrier and its intelligence-carrying sidebands are converted to a surface wave. More specifically, source 10 may be the tunable front end of a television receiver which selects a desired program signal for application to load 22 which, in this environment, comprises those stages of a television receiver subsequent to the IF selector that respond to the program signal in producing a television image and its associated audio program. The surface wave resulting in substrate 12 in response to the energization of transducer 11 by the IF output signal from source 10 is transmitted along the substrate to output transducers 13 and 16 where it is converted to electrical output signals for combination by transistors 15 and 18 and application to load 22.

In a typical television IF embodiment, utilizing PZT as the piezoelectric substrate, the strips of all three transducers are approximately 0.5 mil wide and are separated by 0.5 mil for the application of an IF signal in the typical range of 40–46 megahertz. The spacing between input transducer 11 and output transducer 13 is on the order of 60 mils and the width of the wave front of the surface wave launched by transducer 11 is approximately 100 mils. The function of the input transducer and either one of the output transducers can be compared to that of a cascade of two tuned circuits with a resonant frequency of approximately 40 megahertz, the resonant frequency being determined, at least to a first order, by the spacing of the strips within the transducers.

The potential developed between any given pair of successive strips in the electrode array of transducer 11 produces two waves traveling along the surface of substrate 12 in opposing directions and perpendicular to the strips for the illustrative isotropic case of a ceramic poled perpendicularly to the surface. With the distance between the strips of all transducers being one-half of the acoustic wavelength of the wave at the desired input frequency, or an odd multiple thereof, relative maxima of the output signal at that frequency is produced by piezoelectric transduction in output transducers 13 and 16. To attain increased selectivity, additional electrode strips may be added to the comb patterns of the several transducers. Further modifications and adjustments are described in the aforementioned copending application for the purpose of particularly shaping the response presented by the portion of the filter involving input transducer 11 and either one of output transducers 13 or 16.

Ideally, all of the energy in the surface waves launched by input transducer 11 is extracted by output transducers 13 and 16 but in practice, a portion of the originally transmitted surface waves is reflected by the output transducers back toward the input transducer where further reflection again may be experienced, directing the surface waves towards the output transducers. Upon again arriving at the output transducers the reflected signal energy is significantly delayed relative to the originally transmitted signal energy representative of the same information because of the additional surface-wave travel time between the input and output transducers of the device. This results in wave interference and is undesirable because of the distortion it causes in the output signals.

To the end of avoiding this type of distortion, the distance A, by which output transducers 13 and 16 are unequally spaced from input transducer 11, is made equal to one-fourth, or an odd integral multiple thereof, of a surface-wave wavelength at the designed center frequency. In consequence, a wave which is reflected by output transducer 16 back to input transducer 11 travels a total distance one-half wavelength greater than that traveled by a wave reflected back to the input transducer from output transducer 13. Accordingly, the two reflected waves upon arrival at input transducer 11 are out of phase by 180° as a result of which they cancel one another. The output signals from transducers 13 and 16, which are combined by the matrix including transducers 15 and 18 and fed to load 22, thus are free of distortion or spurious signals that otherwise would be created by the reflected waves. At the same time, the original surface waves interact with output transducers 13 and 16 in such phase as to jointly contribute to the application of signal energy to load 22.

For clarity of presentation, output transducers 13 and 16 are shown in the drawing as separated laterally by a substantial distance. In practice, it is preferable that they be close together so as, between the two of them, to interact with substantially the entire width of the wave fronts launched by input transducer 11. For convenience of fabrication while aiding in that purpose, the innermost combs respectively of transducers 13 and 16 may share a common spine. This preferably retains the electrical interconnection shown that effects the presentation to output transducers 13 and 16 of a common series-coupled electrical load of large magnitude so as to preserve effective electrical isolation between the two output transducers and permit superposition of the output signals in load 22. Alternatively, the two output transducers may be interconnected in parallel. Even though the inner combs of the two different output transducers may by physically joined, the provision of the offset of the two output transducers permits the described reflected-wave cancellation that otherwise would not occur, for example, if the individual output transducers were replaced by a single output transducer in the form of input transducer 11.

When the development of spurious signals as a result of reflected waves is not of significant concern or the effects of such waves are otherwise overcome, the arrangement of FIG. 1 may advantageously be utilized for the different purpose of affording flexibility of design in terms of achieving a desired selectivity or amplitude-frequency response curve of the overall signal transmission path between source 10 and load 22. This is achieved in the design of the SWIF by choice of the spacing A between the leading edges of output transducers 13 and 16, that is, by determining the amount by which they are unequally spaced from the input transducer. Whatever the actual physical distance represented by spacing A, it is selected to be equivalent to less than one-half acoustic wavelength at a designated center frequency.

If spacing A were selected to be exactly equivalent to one-half acoustic wavelength, the two output signals respectively produced by transducers 13 and 16 would be in counter phase and would tend to cancel in load 22. However, for an effective spacing of less than one-half wavelength, the addition of the two output signals results in the development across load 22 of a signal having an amplitude response curve, over a given frequency range or band pass, which may be changed in magnitude and shape by varying distance A. The general form of such response curves is explained and illustrated in the aforesaid copending application and is characterized by a major lobe together with minor lobes at lower and higher frequencies separated by nulls.

That the amplitude-frequency response of the system is a function of distance A may be understood by considering that the addition of two sine waves of identical frequency and amplitude sums to zero whenever a phase difference of $\pi$ radians (180°) exists between them. This would be the case in FIG. 1 when distance A is one-half wavelength and thus equivalent to a phase separation of $\pi$ radians. On the other hand, where the value of distance A is reduced to zero, the two sine waves are of like phase and simply add to or reinforce one another. For intermediate values of distance A, the sine waves combine to give a resultant which changes in amplitude. Because time delay between wave fronts arriving at output transducers 13 and 16 is equivalent to a frequency-sensitive phase shift, different values of distance A result in different summations of the individual waves representing the outputs of these transducers. In this way, additional nulls, that is to say frequencies at which reduced transmission occurs, are exhibited in the response curve. Moreover, as distance A is increased through successive half-wavelength ranges, a null in the response curve at any particular frequency cyclically repeats, because of the cyclic behavior of the wave summation.

Additional shaping of the overall response curve or selectivity characteristic of the system may be obtained by including an attenuator in one output channel or the other, or otherwise providing for overall unequal signal gains, so that the resulting output signals are combined with unequal or controllable amplitudes. However, for the typical purpose of providing a null in the selectivity characteristic so as to effect a trap for a signal of some particular frequency, as in the case of an adjacent-channel sound-signal trap in the intermediate-frequency amplifier of a television receiver, it is preferred that the respective output signal amplitudes be identical. In any case, the choice of the distance or spacing A may be utilized to determine the overall selectivity characteristic or response of the system to the signal being transmitted from source 10 to load 22.

One possible disadvantage in utilizing the system of FIG. 1 to achieve a selected frequency response is that the selection must be made at the time of fabrication of the SWIF. To afford more complete flexibility gain adjustments may be provided for either or both of transistors 15 and 18 but still further flexibility may be attained if a third output transducer is included as in the SWIF of FIG. 2. In this case, input transducer 11 launches acoustic surface waves toward like output transducers 25, 26 and 27 each of which is spaced a different distance from input transducer 11. One comb of each of the output transducers is connected to ground while the other combs are connected individually to the bases of respective transistors 28, 29 and 30 whose individual emitters are returned to ground through respective variable resistors 31, 32 and 33. In this way, the three different output transducers are coupled respectively to the three different input circuits of the transistor amplifiers and those input circuits have a common reference plane. The three transistor collectors are connected in parallel through a blocking capacitor 34 to one side of a load 35 the other side of which also is connected to ground so as to complete the respective output circuits. An operating potential is supplied, from a source B+ through a decoupling resistor 36, between ground and the collectors.

The three different output signals developed respectively by output transducers 25, 26 and 27 are mutually different in phase as a result of the difference in spacing of the different output transducers from input transducer 11. The comparatively lesser spacing of transducer 27 from the input transducer would result in less surface attenuation of the waves reaching it, so that its output signal is somewhat the greatest in amplitude. In other cases, the different spacings may be within one-half wavelength of one another so that the output transducers develop essentially like amplitudes of output signal. In any case, the spacings effectively differ from one another by some fraction of a half-wavelength.

Each of the transistor output signals fed to load 35 may have its amplitude and relative phase with respect to the others represented by a vector. The amplitude of each such vector may be changed by altering the gain of the corresponding transistor, and the phase angle defined by each vector is a function of the relative phase delay occasioned by choice of transducer location. Thus, vectors 37, 38 and 39 in FIG. 2a represent three such output signals for one extreme condition in which they differ from each other in phase by 120° and are of equal amplitude. In that particular case, the vector summation is zero, corresponding to a complete cancellation of the signals as added together for application to load 35. However, a mere change in the adjustment of any one of resistors 31, 32 and 33 alters the gain of the signal transmitted by way of that transistor and thus changes the length of the corresponding vector in FIG. 2a so that the addition of the three vectors yields a resultant signal vector of some particular phase angle and amplitude other than zero; this means that the combined signal developed across load 35 has some particular phase angle relative to the input signal and a selected magnitude. In this way, the system of FIG. 2, by permitting a rather complete manipulation effectively of the length of each of the vectors as shown in FIG. 2a, permits a wide degree of control of both the amplitude and phase angle of the ultimate output signal at any particular frequency.

It is to be noted that, as in the case of FIG. 1, the combination of the three output signals actually involves the superposition of what may be viewed as three sine waves. They add together to give a particular amplitude that is dependent upon the relative amplitudes and upon the relative phase differences between the waves as determined by the differences in spacing of the output transducers from the input transducer, as well as the gain of the individual signal channels including the output transducers. The overall response obtained in the system is a combination of the response characteristics exhibited by each of the three output signal channels, and it may be changed very substantially even after the SWIF has been fabricated, by adjustment of any one or more of variable resistors 31–33 so as to diminish or increase the contribution to the total of any one individual sine wave. This capability of controlling individual wave contribution permits modification of the overall response characteristic of the system. In particular, the combination of the three different responses for any given set of conditions results in null points at certain specific frequencies. The frequencies of those null points may be changed, more or less at will, simply by manipulation of the control elements on the different variable resistors 31–33. In fact, the degree of flexibility is sufficient that it is unnecessary to precalculate the precise net effect of the individual different values possible in each of the variable resistors; it is but a simple matter to observe a sweep of the ultimate output signal across load 35, by means of an oscilloscope or the like, while manipulating the different variable resistors until the desired overall shape is obtained with nulls, or points of maximum attenuation, at precisely the specific different frequencies desired.

Turning now to the SWIF system of FIG. 3, the surface-wave device itself is similar to that of FIG. 1 in that one pair of transducers 40 and 41 are unequally spaced from another transducer 42. In this case, however, transducer 42 serves as an output transducer and a load 43 is connected across its combs. At the same time, what now are input transducers 40 and 41 are coupled respectively into the individual output circuits of a respective pair of transistors 44 and 45 that share a resistor 46 which is common to both of their input and output circuits. A signal source 47 coupled directly into the emitter circuits of transistors 44 and 45 through a blocking capacitor 49 develops an input signal across common resistor 46. Also included in the input circuit of transistor 45 is a control potential source 48. The operating potential for transistors 44 and 45 is applied in shunt to their collectors, through respective decoupling resistors 52 and 53, from one side of a potential source B+ the other side of which is connected to ground.

As illustrated, input transducer 40 is spaced from output transducer 42 by a distance that is one-half wavelength greater than the distance between transducers 41 and 42, and corresponding combs of transducers 40 and 41 are connected to the respective transistor collectors. Consequently, waves traveling out from transducer 40 are phase delayed by 180° as compared with those from transducer 41. With control potential source 48 adjusted so that transistors 44 and 45 equally share the input signal from source 47, surface waves of the same amplitude are launched respectively by input transducers 40 and 41. However, because of the phase delay inherent from the spacing difference, they arrive at output transducer 42 in effective counter phase and hence cancel one another so that no output signal is supplied to load 43. On the other hand, by merely changing the control potential from source 48 so as, in turn, to change the emitter resistance of transistor 45 relative to that of transistor 44, the two signal waves launched respectively by transducers 40 and 41 are of unequal amplitude and complete cancellation does not occur. Consequently, a resulting signal is developed by output transducer 42 and fed to the load. A maximum load signal occurs when the control potential from source 48 is such as to bias transistor 45 to cut off.

As thus described, the system of FIG. 3 acts as a differential amplifier or nulling attenuator, with the surface waves launched by input transducer 41 nulling the effect of those produced by input transducer 40 to a greater or lesser degree depending upon the magnitude of the control potential. Of course, the magnitude of the output signal developed across load 43 may be detected and utilized directly or indirectly as the control potential applied to the input circuit of transducer 45 so as to complete an automatic gain control loop.

It may be noted with respect to FIG. 3 that it is not necessary to physically space transducers 40 and 41 differently from transducer 42 in order to achieve the desired 180° phase displacement. Instead, the same effect may be achieved with equal physical spacings simply by reversing the input connections to one of the input transducers. Because the opposing teeth in each transducer are displaced by one-half wavelength, reversing the connections causes the corresponding combs of the respective transducers to be mutually displaced by 180° even though the complete patterns are laterally aligned. Similarly, the effective position of any of the other transducers in the other embodiments may be shifted one-half wavelength merely be reversing the connecting leads.

Figure 4:
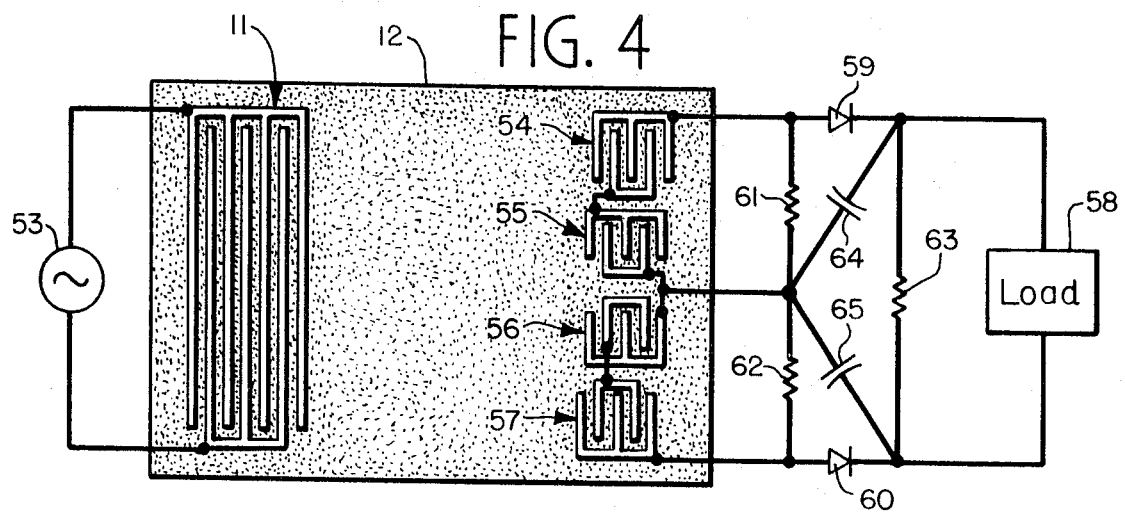

By including and properly arranging still additional output transducers in SWIFS otherwise generally similar to those of FIGS. 1 and 2, the resulting signal transmission system may serve in the manner of FIG. 4 as a frequency discriminator capable of exhibiting a high degree of detection efficiency. In this version, a signal source 53 of frequency-modulated signals is connected across the opposing combs of an input transducer 11 affixed to substrate 12. Transducer 11, as before, launches acoustic surface waves toward a plurality of output transducers 54, 55, 56 and 57. Those output transducers are interconnected to produce a pair of output signals that are fed through a matrixing and detector network for application to a load 58.

More particularly, output transducer 54 is spaced from input transducer 11 beyond adjacent transducer 55 by a distance effectively equal to one-fourth acoustic wavelength in the propagating medium at a desired center frequency to which each of the transducers exhibits a maximum response by virtue of having half-wavelength interdigital spacing. On the other hand, output transducer 57 is spaced toward input transducer 11 from transducer 56 similarly by an effective quarter-wavelength distance. Transducers 54–57 are interconnected in series one to the next except that the connections to transducer 56 are reversed in the arrangement shown wherein the lower two exhibit symmetry with the upper two. Such reversal alternatively may be physically achieved by turning over one of transducers 56 and 57. In any event, when viewed as electric generators, transducers 54 and 55 are connected to be series aiding and transducers 56 and 57 are connected to be series opposing.

For the purpose of demodulating the signal information, the matrixing network takes a form analogous to that known as the Foster-Seeley type. As specifically embodied herein, it includes a pair of diodes 59 and 60 individually connected between respective sides of load 58 and output transducers 54 and 57. The detection network additionally includes a pair of load resistors 61 and 62 individually connected between respective ones of the diode anodes and the point intermediate transducers 55 and 56. Output load-impedance matching is effected by a resistor 63 connected between the diode cathodes and capacitors 64 and 65 individually connected between the point intermediate transducers 55 and 56 and the respective cathodes.

In operation, a change in the instantaneous input frequency, representing signal modulation, effects an increase in the output signal potential applied to one diode and a decrease in that applied to the other diode. Those amplitudes change in respectively opposite directions when the signal frequency changes to the other side of the undeviated or center frequency $f_c$. At the center frequency $f_c$, equal potentials are applied to the two diodes as a result of which the net potential across load 53 is zero. When the signal frequency is less than $f_c$, a greater potential is applied to diode 59 than to diode 60. Conversely, when the signal frequency is greater than $f_c$, the larger potential appears at diode 60. Consequently, the overall signal transfer characteristic between source 53 and load 58, as seen by the load, is the familiar discriminator characteristic illustrated in FIG. 5. The steepness of the characteristic is a function of the bandwidth of the signal transmission system which, for example, may be narrowed by the simple expedient of increasing the number of individual electrodes in the combs of input transducer 11.

Figure 6:
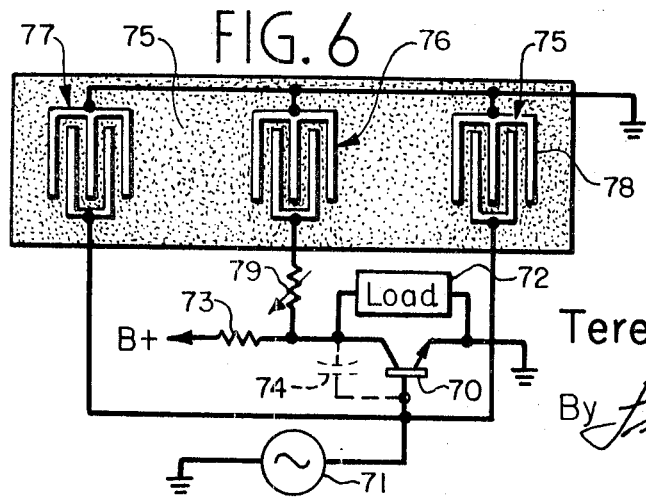

Particularly when using three-element active devices such as the transistors employed in FIGS. 1-3, some difficulty can be encountered by reason of capacitance feedback between the output electrodes. This is illustrated in FIG. 6 wherein an amplifier includes a transistor 70 into the input signal circuit of which a signal source 71 is coupled. A load 72 is coupled into its output signal circuit and an operating potential from a source B+ is supplied to its collector through a decoupling resistor 73. In operation, a portion of the amplified signal energy appearing in the output circuit is coupled back to the input circuit by way of stray interelectrode capacitance as indicated by capacitor 74. Particularly at high gains, the magnitude of the signal energy fed back becomes sufficient to cause the amplifier to regenerate with a resulting distortion or complete swamping of the desired signal being transmitted.

In order to overcome the feedback effect of parasitic capacitor 74 and hence to neutralize the amplifier including transistor 70, the amplifier is associated with, and indeed preferably is formed as an integrated circuit directly upon, a substrate 75 again of piezoelectric material. An input transducer 76 is disposed on a first portion of substrate 75 and a pair of output transducers 77 and 78 also are affixed to substrate 75 in positions to receive and interact with surface waves launched by transducer 76. Input transducer 76 is connected through a variable resistor 79 into the transistor output circuit in parallel with load 72. At the same time, output transducers 77 and 78 are connected in parallel across the input circuit of transistor 70 in parallel with input source 71.

In operation, the feedback capacitance represented by capacitor 74 imparts a 90° leading phase shift to the feedback signal. To compensate that feedback, output transducers 77 and 78 are each spaced from input transducer 76 by a distance such that the signal, which at the same time is fed back between the output and input circuits by way of the traveling surface waves, has a phase which is shifted 180° with respect to that of the undesired signal transmitted by capacitor 74. That is, the signal fed back by way of the SWIF is caused to lag by 90° and hence cancel the capacitive feedback signal. Neutralization for the amplifier is thus obtained. Adjustment of variable resistor 79 permits variation of the magnitude of the canceling feedback signal by way of the SWIF so as to match exactly the amplitude of the undesired capacitive signal.

In practice, a sufficient level of the neutralizing signal fed back by way of the SWIF may be obtained with but a single output transducer, so that either transducer 77 or transducer 78 may be omitted. Otherwise, the operation remains the same. Of particular significance from the standpoint of completely integrating all of the circuitry into a single package, transducers 76 and 77 may be deposited directly on additional portions of substrate 12 in any of the systems of FIGS. 1, 2 or 3. In the same way, the different transistors utilized in the systems of those figures and in FIG. 6 likewise may be integrated directly as part of the same solid-state package as that of the SWIF with which they are associated.

A variety of SWIF systems have been shown and described that enable fabrication into completely solid-state integrated form various different signal transmission stages which, in systems using discrete components to accomplish similar results, require physically cumbersome and sometimes large elements such as wound-coil inductors. Moreover, the embodiments herein presented are particularly useful in affording a wide degree of adjustment of such parameters as overall frequency response, the position, in terms of frequency, of null points, and detection and gain characteristics.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A signal transmission system interposed between a signal source and a load comprising
    an acoustic wave propagating medium;
    a first interaction means coupled to said signal source and also coupled to said medium for bunching acoustic surface waves along a wave propogating path in said medium in response to signals from said source;
    a second interaction means coupled to said medium and also coupled to said load for responding to said surfaces waves to deliver output signals to said load;
    one of said interaction means including a single acoustic-surface-wave transducer disposed entirely across said path and other of said interaction means including a plurality of said acoustic-surface-wave transducers disposed in essentially side-by-side relation across different assigned fractional portions of said path, and spaced along said medium a predetermined distance from said single transducer and all of said transducers having maximum response at substantially the same frequency;
    and matrix means for coupling said plurality of transducers of said other interaction means to its assigned one of said source and said load,
    said matrix means including a corresponding plurality of variable-gain electron valves for controlling the relative amplitudes of the signals transmitted through said plurality of transducers to determine the amplitude-frequency response of said system.

2. A signal transmission system according to claim 1 in which the spacings of at least two of said plurality of transducers from said single transducer are unequal and, in effect differ from one another by less than one-half acoustic wavelength in said medium at said frequency of maximum response further to determine the amplitude-frequency response to said system.

3. A signal transmission system in accordance with claim 2 in which said spacings effectively differ from one another by one-fourth of an acoustic wavelength at said frequency.

4. A signal transmission system in accordance with claim 1 in which said other interaction means includes three of said surface-wave transducers individually coupled to said load and having unequal spacings from said single transducer along said medium.

* * * * *